US012674455B2

(12) United States Patent
Harada et al.

(10) Patent No.: US 12,674,455 B2
(45) Date of Patent: Jul. 7, 2026

(54) SUPPORT STRUCTURE OF ELECTRIC COMPRESSOR

(71) Applicant: SUMITOMO RIKO COMPANY LIMITED, Komaki (JP)

(72) Inventors: Takuma Harada, Komaki (JP); Takayoshi Yasuda, Komaki (JP); Ruozhou Wang, Komaki (JP); Hideto Nishinaka, Komaki (JP); Hideo Yanagino, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 19/032,539

(22) Filed: Jan. 21, 2025

(65) Prior Publication Data

US 2025/0314252 A1 Oct. 9, 2025

(30) Foreign Application Priority Data

Apr. 9, 2024 (JP) ................................. 2024-062806

(51) Int. Cl.
*F04C 18/02* (2006.01)
*F04C 29/00* (2006.01)
(Continued)

(52) U.S. Cl.
CPC .......... *F04C 18/0215* (2013.01); *F04C 29/00* (2013.01); *F16F 1/38* (2013.01);
(Continued)

(58) Field of Classification Search
CPC ........ F04C 2/025; F04C 18/0207–0292; F04C 2230/604; F04C 2270/12; F04C 2270/125; F01C 1/0207–0292
See application file for complete search history.

(56) References Cited

U.S. PATENT DOCUMENTS 8,839,899 B2 9/2014 Kim et al.
9,193,250 B2 11/2015 Kim
(Continued)

FOREIGN PATENT DOCUMENTS

CN 214112223 U * 9/2021
EP 0891886 A1 * 1/1999 ............... B60K 5/12
(Continued)

*Primary Examiner* — Laert Dounis
(74) *Attorney, Agent, or Firm* — Oliff PLC

(57) ABSTRACT

An electric compressor support structure on a vehicle body side member, including: an electric compressor including: an electric motor driving a scroll-type compression mechanism part to rotate; and a case housing the electric motor and the compression mechanism part arranged in series in output shaft direction of the electric motor; at least two first vibration-damping devices located on both sides of the case in an extension direction of a torque pitch axis intersecting the output shaft direction, arranged in a region with incli- nation angle to the torque pitch axis of ±20 degrees; and at least two second vibration-damping devices located on both sides of the case in an extension direction of a torque yaw axis intersecting the output shaft direction and the torque pitch axis, arranged in a region with inclination angle to the torque yaw axis of ±20 degrees.

5 Claims, 9 Drawing Sheets

(51) Int. Cl.
    *F16F 1/38*           (2006.01)
    *F16F 15/08*        (2006.01)

(52) U.S. Cl.
    CPC ........ *F16F 15/08* (2013.01); *F04C 2230/604*
           (2013.01); *F04C 2240/30* (2013.01); *F04C*
          *2240/40* (2013.01); *F04C 2270/12* (2013.01)

(56)              References Cited

U.S. PATENT DOCUMENTS

| | | |
|---|---|---|
| 11,592,023 B2 | 2/2023 | Hara et al. |
| 2013/0068552 A1* | 3/2013 | Kim .................... B60K 5/1216 |
| | | 180/300 |
| 2013/0161111 A1 | 6/2013 | Kim et al. |

FOREIGN PATENT DOCUMENTS

| | | | |
|---|---|---|---|
| JP | S6212418 A | * | 1/1987 |
| JP | H0126891 B2 | * | 5/1989 |
| JP | 2004-009931 A | | 1/2004 |
| JP | 2016-138495 A | | 8/2016 |

\* cited by examiner

BACK

LEFT ←——→ RIGHT

FRONT

SUPPORT STRUCTURE OF ELECTRIC COMPRESSOR

INCORPORATED BY REFERENCE

The disclosure of Japanese Patent Application No. 2024-062806 filed on Apr. 9, 2024 including the specification, drawings and abstract is incorporated herein by reference in its entirety.

BACKGROUND ART

1. Technical Field

The present disclosure relates to a support structure of an electric compressor, wherein the electric compressor is supported in a vibration-damping manner on a vehicle body side member with a vibration-damping apparatus.

2. Description of the Related Art

Conventionally, vehicles such as automobiles, for example, are equipped with electric compressors that constitute refrigeration units such as air conditioning units. The electric compressor is attached to a vehicle body side member, as disclosed in Japanese Unexamined Patent Publication No. JP-A-2016-138495, for example.

There are known several types of electric compressors that vary in their compression methods, such as reciprocating-type compressors and screw-type compressors. Adoption of the scroll-type one as shown in JP-A-2016-138495 is considered as the electric compressors for automobiles and other vehicles. The scroll-type compressor boosts pressure of a gas between spiral wall bodies of a pair of scrolls, which are mutually inserted, by volume change between the spiral wall bodies of the scrolls owing to their relative rotation. In the electric compressor, for example, one of the scrolls is fixed so that it does not rotate while the other scroll is rotated by an electric motor.

SUMMARY

In the scroll-type electric compressor, during operation, vibration is generated by eccentric rotation of the scrolls, which constitute a compression mechanism part. Therefore, it is necessary to prevent transmission of the vibration to the vehicle body side member to be damped. Thus, the electric compressor is connected in a vibration-damping manner to the vehicle body side member via a vibration-damping apparatus. For example, in JP-A-2016-138495, a plurality of elastic members are arranged between the electric compressor and the vehicle body side member so that vibration-damping action of the elastic members inhibits vibration transmission from the electric compressor to the vehicle body side member.

However, in JP-A-2016-138495, the electric compressor is located on the upper side of the vehicle body side member, and the plurality of elastic members are simply interposed between the electric compressor and the vehicle body side member. With the configuration, the vibration transmission from the electric compressor to the vehicle body side member could not be sufficiently suppressed.

Particularly, in JP-A-2016-138495, the electric compressor is elastically supported on the upper side of the vehicle body side member in a cantilever manner by the plurality of elastic members arranged on the lower side of the electric compressor. Therefore, for example, there is a risk that the vibration of the electric compressor is amplified in a certain frequency range and the vibration transmission state to the vehicle body side member may deteriorate significantly.

It is therefore one object of the present disclosure to provide a support structure of an electric compressor of novel structure which is able to more effectively reduce the transmission of vibration from a scroll-type electric compressor to a vehicle body side member.

Hereinafter, preferred embodiments for grasping the present disclosure will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present disclosure, various other preferred embodiments can be realized without being limited to those described below.

A first preferred embodiment provides a support structure of an electric compressor for supporting the electric compressor in a vibration-damping manner with a vibration-damping apparatus on a vehicle body side member, the support structure comprising: the electric compressor comprising: an electric motor; a scroll-type compression mechanism part driven to rotate by the electric motor; and a case housing the electric motor and the compression mechanism part arranged in series in a direction of an output shaft of the electric motor wherein the output shaft extends; and the vibration-damping apparatus comprising: at least two first vibration-damping devices being located respectively on both sides of the case in an extension direction of a torque pitch axis intersecting the direction of the output shaft, each of the first vibration-damping devices being arranged in a region with an inclination angle relative to the torque pitch axis of ±20 degrees; and at least two second vibration-damping devices being located respectively on both sides of the case in an extension direction of a torque yaw axis intersecting the direction of the output shaft and the torque pitch axis, each of the second vibration-damping devices being arranged in a region with an inclination angle relative to the torque yaw axis of ±20 degrees.

Through examination and experimentation, the inventors have found that the vibration, which is exerted by the eccentric rotation of the scrolls and transmitted from the electric compressor to the vehicle body side member, is mainly caused by moments around two torque axes (the torque pitch axis and the torque yaw axis). The two torque axes are other than the torque roll axis that extends in the direction of the output shaft of the electric motor. Based on this finding, the inventors have invented the support structure of the electric compressor that can suppress the transmission of vibration to the vehicle body side member.

Specifically, with the support structure of the electric compressor structured according to this preferred embodiment, the vibration caused by the moment around the torque pitch axis, which is generated by rotation of the compression mechanism part as an eccentric mass, is transmitted from the electric compressor to the vehicle body side member through the first vibration-damping devices. This transmission is reduced because the first vibration-damping devices are located near the torque pitch axis. Furthermore, since the second vibration-damping devices are located on both sides of the center of gravity of the electric compressor, the forces due to the moment around the torque pitch axis acting on the second vibration-damping devices located on the both sides act in mutually opposite directions and cancel each other out in the vehicle body side member. In this way, the vibration caused by the moment around the torque pitch axis is inhibited from being transmitted to the vehicle body side member.

The vibration caused by the moment around the torque yaw axis, which is generated by the rotation of the compression mechanism part as an eccentric mass, is transmitted from the electric compressor to the vehicle body side member through the second vibration-damping devices. This transmission is reduced because the second vibration-damping devices are located near the torque yaw axis. Furthermore, since the first vibration-damping devices are located on both sides of the center of gravity of the electric compressor, the forces due to the moment around the torque yaw axis acting on the first vibration-damping devices located on both sides act in mutually opposite directions and cancel each other out in the vehicle body side member. In this way, the vibration caused by the moment around the torque yaw axis is inhibited from being transmitted to the vehicle body side member.

Thus, based on the new view point that the input caused by the eccentric rotation of the compression mechanism part generated in the scroll-type electric compressor is transmitted to the vehicle body side member as a vibration load caused by the moments around each of the torque pitch axis and the torque yaw axis of the electric compressor, in the support structure of the electric compressor according to this preferred embodiment, the arrangement of the vibration-damping devices relative to the torque pitch and torque yaw axes is invented. This realizes the support structure of the electric compressor that can effectively suppress the transmission of vibration from the electric compressor to the vehicle body side member.

A second preferred embodiment provides the support structure of the electric compressor according to the first preferred embodiment, wherein each of the first vibration-damping devices is located at least partially on the torque pitch axis, while each of the second vibration-damping devices is located at least partially on the torque yaw axis.

With the support structure of the electric compressor structured according to this preferred embodiment, the first vibration-damping devices are positioned closer to the torque pitch axis so that they are located at least partially on the torque pitch axis. This further reduces the transmission of vibration caused by the moment around the torque pitch axis through the first vibration-damping devices. Also, the second vibration-damping devices are positioned closer to the torque yaw axis so that they are located at least partially on the torque yaw axis. This further reduces the transmission of vibration caused by the moment around the torque yaw axis through the second vibration-damping devices.

A third preferred embodiment provides the support structure of the electric compressor according to the first or second preferred embodiment, wherein each of the first vibration-damping devices is located singly on each side of the case in the extension direction of the torque pitch axis, while each of the second vibration-damping devices is located singly on each side of the case in the extension direction of the torque yaw axis.

With the support structure of the electric compressor constructed according to the present preferred embodiment, the electric compressor can be supported on the vehicle body side member with a small number of vibration-damping devices. In addition, the fact that the first and second vibration-damping devices are fewer makes it easier to position the first and second vibration-damping devices in appropriate locations.

A fourth preferred embodiment provides the support structure of the electric compressor according to any one of the first through third preferred embodiments, wherein the first vibration-damping devices and the second vibration-damping devices each comprise a tubular vibration-damping device including an inner shaft member, an outer tube member, and a main rubber elastic body connecting the inner shaft member and the outer tube member, an axial direction of the inner shaft member of each of the first vibration-damping devices attached to the case is the extension direction of the torque pitch axis, and an axial direction of the inner shaft member of each of the second vibration-damping devices attached to the case is the extension direction of the torque yaw axis.

With the support structure of the electric compressor constructed according to the present preferred embodiment, the first vibration-damping devices each include the tubular vibration-damping device and its axial direction is the extension direction of the torque pitch axis, which lowers the torsional rigidity when the moment acts around the torque pitch axis. Therefore, the low torsional rigidity of the first vibration-damping devices also makes it possible to set the resonance frequency in the support structure of the electric compressor to a lower frequency. Similarly, the second vibration-damping devices each include the tubular vibration-damping device and its axial direction is the extension direction of the torque yaw axis, which lowers the torsional rigidity when the moment acts around the torque yaw axis. Therefore, the low torsional rigidity of the second vibration-damping devices also makes it possible to set the resonance frequency in the support structure of the electric compressor to a lower frequency.

A fifth preferred embodiment provides the support structure of the electric compressor according to any one of the first through fourth preferred embodiments, wherein for one of the first vibration-damping devices located on a first side of the case and an other of the first vibration-damping devices located on a second side of the case, a difference in distances from a center of gravity of the electric compressor is 20% or less of a shorter one of the distances, and for one of the second vibration-damping devices located on a first side of the case and an other of the second vibration-damping devices located on a second side of the case, a difference in distances from the center of gravity of the electric compressor is 20% or less of a shorter one of the distances.

With the support structure of the electric compressor constructed according to the present preferred embodiment, the difference in the distances between the first vibration-damping devices on the both sides of the case and the center of gravity of the electric compressor is small. This decreases the difference in the vibration loads exerted on the first vibration-damping devices on the both sides of the case by the moment around the torque yaw axis. Therefore, the vibration loads transmitted to the vehicle body side member via the first vibration-damping devices on the both sides of the case are more effectively cancelled, and the transmission of vibration to the vehicle body side member is suppressed.

Similarly, the difference in distances between the second vibration-damping devices on the both sides of the case and the center of gravity of the electric compressor is small. This reduces the difference in the vibration loads exerted on the second vibration-damping devices on the both sides of the case by the moment around the torque pitch axis. Therefore, the vibration loads transmitted to the vehicle body side member via the second vibration-damping devices on the both sides of the case are more effectively cancelled, and the transmission of vibration to the vehicle body side member is suppressed.

The present disclosure can reduce the transmission of vibration from the scroll-type electric compressor to the vehicle body side member in the support structure of the electric compressor.

BRIEF DESCRIPTION OF THE DRAWINGS

The foregoing and/or other objects, features and advantages of the disclosure will become more apparent from the following description of a practical embodiment with reference to the accompanying drawings in which like reference numerals designate like elements and wherein.

DETAILED DESCRIPTION

There will be described a practical embodiment of the present disclosure with reference to the drawings.

Figure 1:
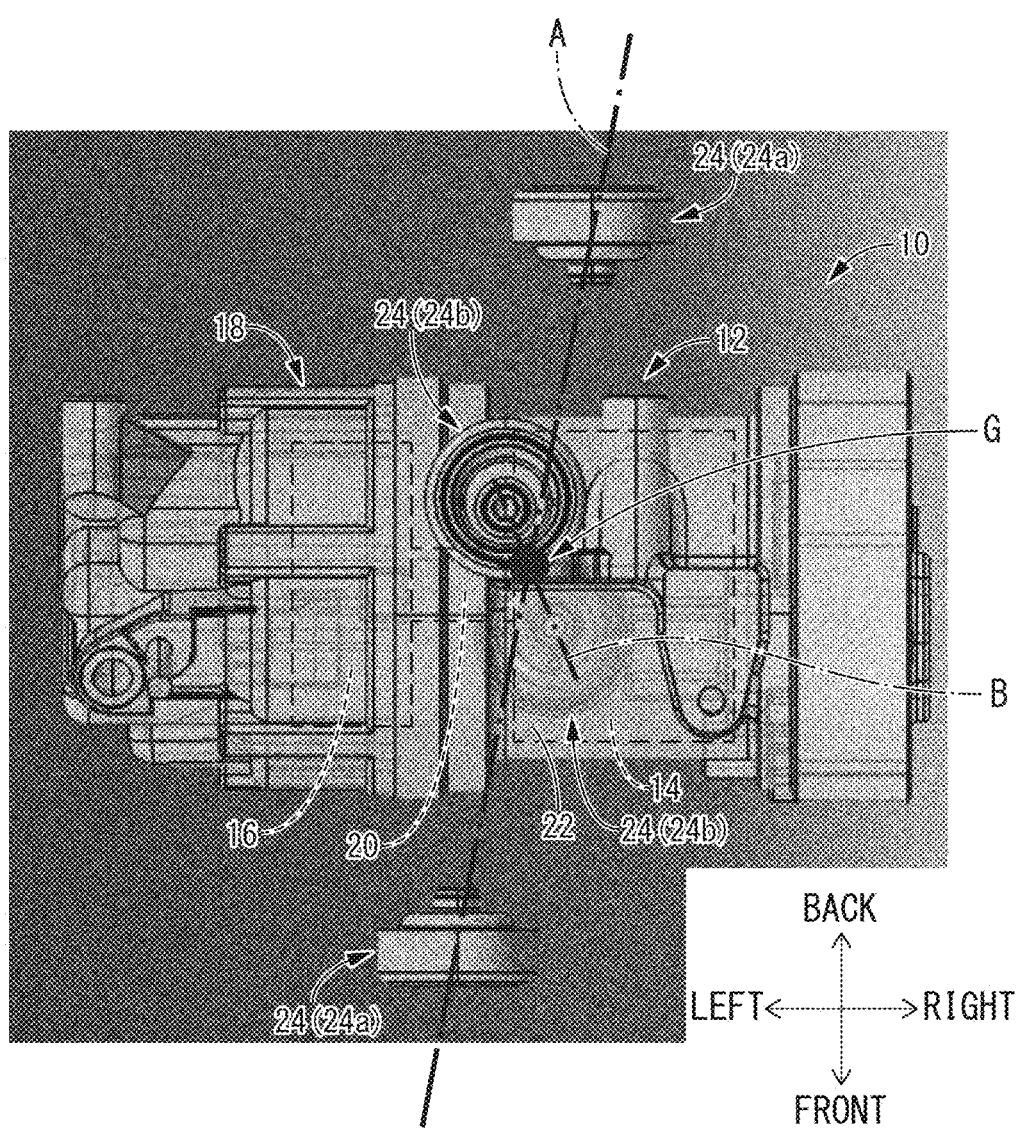
FIG. 1 is a plan view showing a support structure of an electric compressor as a first practical embodiment of the present disclosure.
Figure 2:
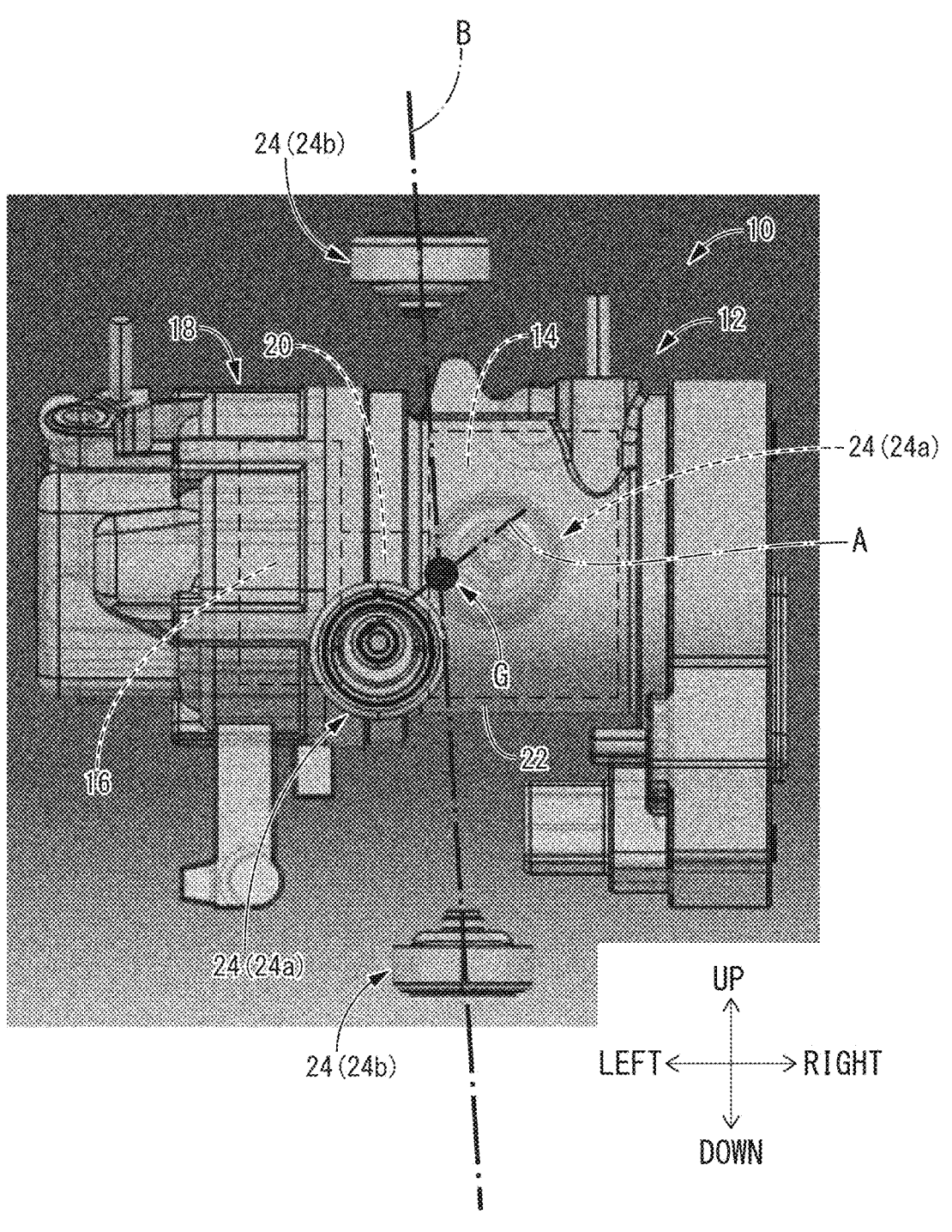
FIG. 2 is a front view of the support structure of the electric compressor shown in FIG. 1.
Figure 3:
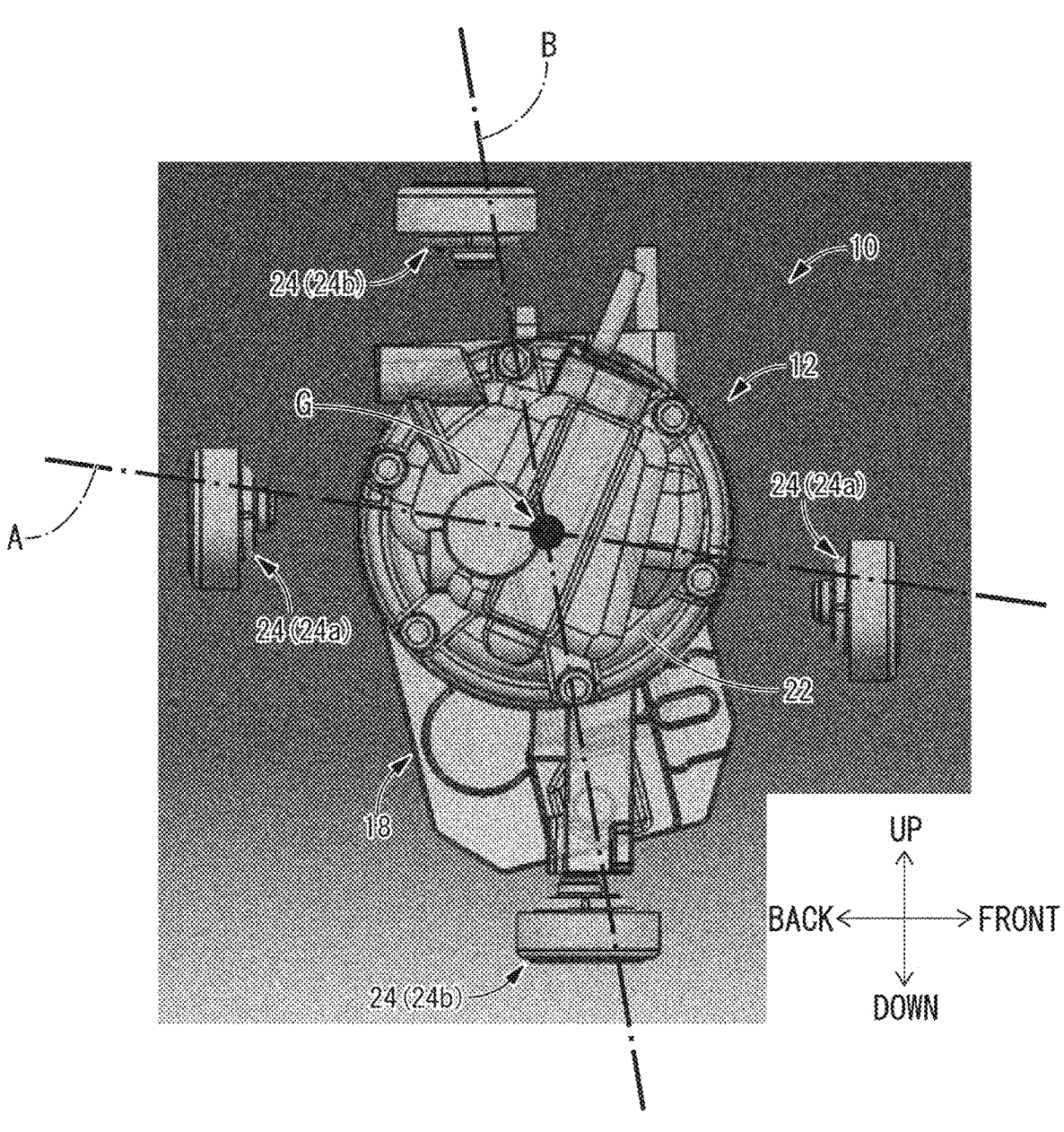
FIG. 3 is a left side view of the support structure of the electric compressor shown in FIG. 1.

FIGS. 1 to 3 show a support structure 10 of an electric compressor as a first practical embodiment of the present disclosure. The support structure 10 of the electric compressor includes an electric compressor 12. In the following explanation, in general rules, the up-down direction means the up-down direction in FIG. 2, which is the vehicle vertical direction, the front-back direction means the up-down direction in FIG. 1, which is the vehicle front-back direction, and the left-right direction means the left-right direction in FIG. 1, which is the vehicle left-right direction.

The electric compressor 12 is a scroll-type electric compressor wherein an electric motor 14 and a scroll member 16 as a compression mechanism part are housed in a case 18 of hollow structure. The electric motor 14 is, for example, an AC brushless motor. The electric motor 14 outputs rotational force when an output shaft 20 is driven to rotate by an external power supply. The electric motor 14 is housed in a housing body 22 of the case 18. The housing body 22, which is the housing section for the electric motor 14, is a tubular portion that surrounds the electric motor 14 and extends continuously around the entire circumference with a smooth surface in the circumferential direction. The housing body 22 does not include portions projecting locally on the circumference, such as ribs for attaching accessories, ribs for reinforcement, and the like.

The scroll member 16 comprises a fixed scroll securely positioned relative to the case 18 and a swivel scroll attached to the output shaft 20 of the electric motor 14 and driven to rotate integrally with the output shaft 20. The swivel scroll is rotatable relative to the fixed scroll. The fixed scroll and the swivel scroll are provided with spiral wall bodies each extending in a spiral shape. For example, the fixed scroll and the swivel scroll are arranged in different directions, with a phase difference in the circumferential direction (the rotational direction of the output shaft 20), and the spiral wall body of the swivel scroll is inserted in a gap in the spiral wall body of the fixed scroll in the radial direction. The volume of the compression chamber, which is constituted by the gap between the spiral wall bodies, changes depending on the circumferential orientation (the amount of rotation) of the swivel scroll relative to the fixed scroll. The compression chamber is filled with a working fluid of liquid or gas.

The swivel scroll is attached to the output shaft 20 of the electric motor 14 and arranged in series with the electric motor 14 in the axial direction of the output shaft 20 (the left-right direction). Since the swivel scroll and the fixed scroll are arranged substantially coaxially so that they face each other, the scroll member 16 constituted by the swivel scroll and the fixed scroll is arranged in the case 18 in series with the electric motor 14 in the axial direction in which the output shaft 20 extends (the direction of the output shaft).

When the swivel scroll is driven to rotate by the output of the electric motor 14, the working fluid introduced from a not-shown inlet port into the compression chamber is compressed by the volume change of the compression chamber, and the compressed working fluid is discharged from a not-shown outlet port into an external flow path. In the scroll member 16, for example, the inlet port is provided at an end on the outer peripheral side of the fixed scroll and the swivel scroll (an outer peripheral edge), while the outlet port is provided at an end on the inner peripheral side (the center) of the fixed scroll and the swivel scroll.

Figures 4, 5:
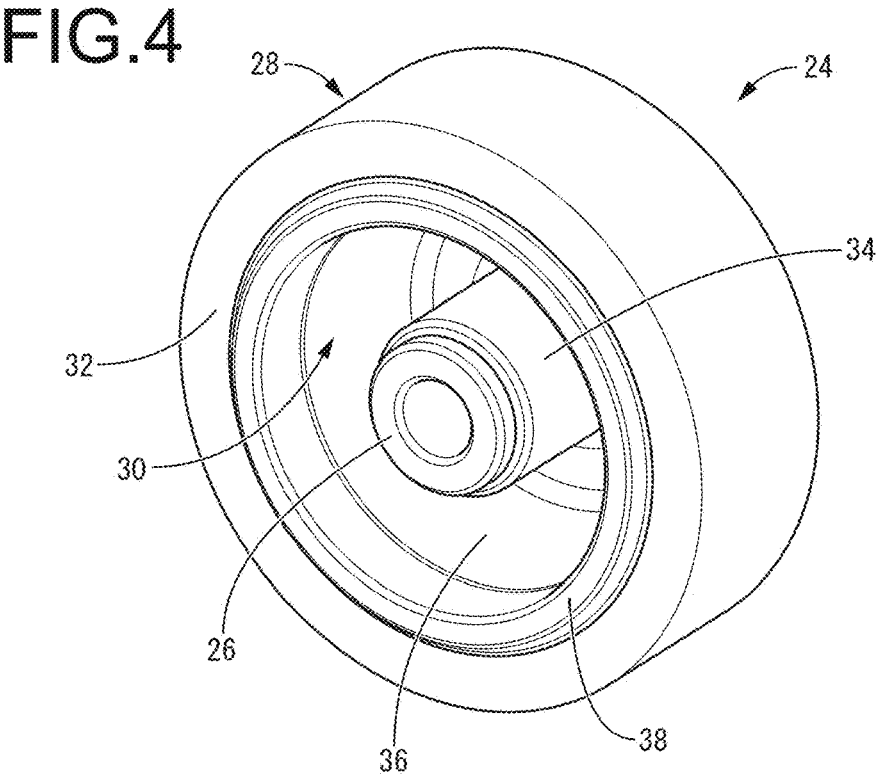
FIG. 4 is a perspective view showing a vibration-damping device in the form of a rubber mount constituting the support structure of the electric compressor shown in FIG. 1.
FIG. 5 is a cross section view of the rubber mount shown in FIG. 1.

The electric compressor 12 having this structure is supported in a vibration-damping manner with a rubber mount 24 as a vibration-damping device on a vehicle body side member 40 which will be described below. As shown in FIGS. 4 and 5, the rubber mount 24 is a tubular vibration-damping device including an inner shaft member 26, an outer tube member 28, and a main rubber elastic body 30 connecting them.

The inner shaft member 26 has an approximately cylindrical shape with a small diameter. The inner shaft member 26 is a highly rigid member formed, for example, of a metal or a fiber-reinforced synthetic resin, etc. The outer tube member 28 has an approximately cylindrical shape with a large diameter. The outer tube member 28 has an inner flanged stopper portion 32 projecting radially inward from one end thereof in the axial direction. The outer tube member 28 is a highly rigid member formed, for example, of a metal or a fiber-reinforced synthetic resin, etc.

The main rubber elastic body 30 has a radially inner adhered portion 34 of a small-diameter tubular shape whose radially inner end is adhered to the outer peripheral surface of the inner shaft member 26. The main rubber elastic body 30 has a cup-shaped connecting portion 36 extending from the radially inner adhered portion 34 toward the outer periphery. The connecting portion 36 projects from the radially inner adhered portion 34 in the axis-perpendicular direction to be bent in the midway and then extend out in the axial direction while expanding, and the end is adhered to the stopper portion 32 of the outer tube member 28. A stopper rubber 38 protruding in the axial direction toward the vehicle body side member 40 described below is adhered to the stopper portion 32 of the outer tube member 28, and in this practical embodiment, the stopper rubber 38 is integrally formed with the main rubber elastic body 30.

For the rubber mount 24, the inner shaft member 26 is attached to the case 18 of the electric compressor 12 while the outer tube member 28 is attached to the vehicle body side member 40. The method of fastening the inner shaft member 26 to the case 18 is not particularly limited. For example, the inner shaft member 26 is bolted to the case 18 with bolts that are inserted into the inner shaft member 26 and are not illustrated. The method of fastening the outer tube member 28 to the vehicle body side member 40 is not particularly limited. For example, the outer tube member 28 is secured by being press-fitted into a mounting hole provided in the vehicle body side member 40.

The rubber mount 24 constituting the support structure 10 of the electric compressor comprises four rubber mounts, i.e., first rubber mounts 24a, 24a as first vibration-damping devices and second rubber mounts 24b, 24b as second vibration-damping devices, as shown in FIGS. 1 to 3. In this practical embodiment, the first rubber mount 24a and the second rubber mount 24b are identical to each other. However, the first rubber mount 24a and the second rubber mount 24b can be of different structures from each other.

The two first rubber mounts 24a, 24a are located on a torque pitch axis A of the electric compressor 12, indicated by the dot-and-dash line in FIGS. 1 to 3. Each of the two first rubber mounts 24a, 24a is located singly on each side of the case 18 of the electric compressor 12 in the extension direction of the torque pitch axis A. Each first rubber mount 24a is attached to the electric compressor 12 in such an orientation that the center axis direction of the first rubber mount 24a substantially coincides with the extension direction of the torque pitch axis A, which includes configurations wherein these directions incline relative to each other at an inclination angle of 20 degrees or less, beyond limitation to strict matching. The two first rubber mounts 24a, 24a are oriented to the opposite sides in the axial direction.

Figure 6:
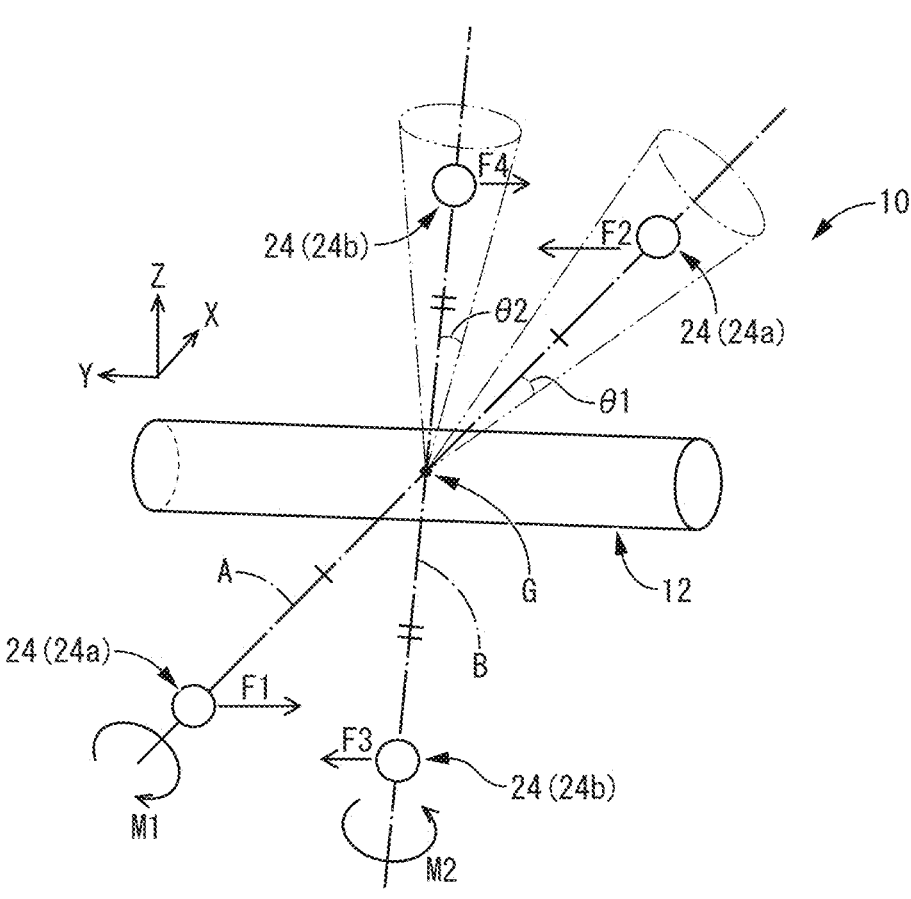
FIG. 6 is a specific view depicting the support structure of the electric compressor shown in FIG. 1.

The two first rubber mounts 24a, 24a are each separated from a center of gravity G of the electric compressor 12 by almost the same distance, as shown in FIG. 6. For the two first rubber mounts 24a, 24a, the difference in the distances from the center of gravity G of the electric compressor 12 should be 20% or less of the shorter one of the distances, and more preferably, the distances are the same on design.

The two second rubber mounts 24b, 24b are located on a torque yaw axis B of the electric compressor 12, indicated by the dot-and-dash line in FIGS. 1 to 3. Each of the two second rubber mounts 24b, 24b is located singly on each side of the case 18 of the electric compressor 12 in the extension direction of the torque yaw axis B. Each second rubber mount 24b is attached to the electric compressor 12 in such an orientation that the center axis direction of the second rubber mount 24b substantially coincides with the extension direction of the torque yaw axis B, which includes configurations wherein these directions incline relative to each other at an inclination angle of 20 degrees or less, beyond limitation to strict matching. The two second rubber mounts 24b, 24b are oriented to the opposite sides in the axial direction.

The two second rubber mounts 24b, 24b are each separated from the center of gravity G of the electric compressor 12 by almost the same distance, as shown in FIG. 6. For the two second rubber mounts 24b, 24b, the difference in the distances from the center of gravity G of the electric compressor 12 should be 20% or less of the shorter one of the distances, and more preferably, the distances are the same on design.

The first rubber mounts 24a, 24a and the second rubber mounts 24b, 24b are shown in FIGS. 1 to 3 to be at a distance from the electric compressor 12. For the first rubber mounts 24a, 24a and the second rubber mounts 24b, 24b in such arrangement, each inner shaft member 26 is indirectly attached to the electric compressor 12 via a not-shown bracket, for example. Alternatively, each inner shaft member 26 of the first rubber mounts 24a, 24a and the second rubber mounts 24b, 24b may be directly attached to the case 18 of the electric compressor 12 without the bracket or other separate member being interposed.

The torque pitch axis A and the torque yaw axis B of the electric compressor 12 are two other torque axes that intersect the torque roll axis and intersect one another at the center of gravity G of the electric compressor 12. The torque pitch axis A and the torque yaw axis B of the electric compressor 12 each extend in a direction to intersect the axial direction of the output shaft 20 of the electric motor 14. The torque roll axis is the torque axis (axis of rotation) of the electric compressor 12 that has the smallest inclination angle relative to the axial direction of the output shaft 20 of the electric motor 14, and can be calculated using the inertia tensor I (see below) in the same way as the torque pitch axis A and the torque yaw axis B.

The torque pitch axis A and the torque yaw axis B can be determined for the electric compressor 12 located in a coordinate space with mutually orthogonal X, Y, and Z coordinate axes, as shown in FIG. 6, for example, by the following calculation. The orientation of the electric compressor 12 relative to the coordinate axes can be set desirably, and only one torque pitch axis A and only one torque yaw axis B are determined depending on the orientation of the electric compressor 12 relative to the coordinate axes. The orientation of the electric compressor 12 relative to the coordinate axes is not particularly limited, but in FIG. 6, when the electric compressor 12 is installed in a vehicle, the X-axis is set to the vehicle front-back direction (the up-down direction in FIG. 1), the Y-axis is set to the vehicle left-right direction (the left-right direction in FIG. 1), and the Z-axis is set to the vertical up-down direction (the up-down direction in FIG. 2). In FIG. 6, the electric compressor 12 is cylindrical and the rubber mount 24 is spherical for simplicity.

That is, first, the inertia moment tensor I (hereafter, inertia tensor I) as shown in [Number 1] is calculated. The inertia tensor I is a 3×3 matrix determinant, as shown in [Number 1], and it is determined by the shape and mass distribution of the electric compressor 12, so it can be obtained based on their measurements and design values. The inertia tensor I can also be obtained, for example, by obtaining the inertia tensor of the principal axis of inertia by actual measurement and then performing a coordinate transformation on the inertia tensor of the principal axis of inertia.

$$I = \begin{bmatrix} Ixx & -Ixy & -Ixz \\ -Ixy & Iyy & -Iyz \\ -Ixz & -Iyz & Izz \end{bmatrix} \qquad \text{[Number 1]}$$

The torque pitch axis A and the torque yaw axis B can be each recognized as one of the center axes of rotation of the electric compressor 12 when the electric compressor 12 is operated, and can be determined by calculation or experimentation using known methods, if the electric compressor
12 is specifically identified. If the inertia products (off-
diagonal elements) are zero in the inertia tensor I of [Num-
ber 1], the torque pitch axis A and the torque yaw axis B can
be each recognized as one of the principal axes of inertia of
the electric compressor 12, and constitute three orthogonal
axes, together with the principal axis of inertia (torque roll
axis) that extends substantially along the direction of the
center axis of rotation of the output shaft 20 of the electric
compressor 12 and the scroll member 16. Although the
electric compressor 12 is a rigid body, the mass distribution
and moment of inertia may change by the rotation of the
scroll member 16, etc. If the inertia products are not zero due
to such changes and the fixed support condition of the
electric compressor 12 on the vehicle body side (via
mounts), and the like, the determined torque pitch axis A and
torque yaw axis B do not satisfy the orthogonality condition.

Next, the direction vector a of the torque pitch axis A is
obtained by the calculation shown in [Number 2]. The
torque pitch axis A is a straight line passing through the
coordinate of the center of gravity G of the electric com-
pressor 12, with the direction vector a calculated by [Num-
ber 2].

$$\alpha = \begin{Bmatrix} \ddot{\theta}_{ax} \\ \ddot{\theta}_{ay} \\ \ddot{\theta}_{az} \end{Bmatrix} = I^{-1} \begin{Bmatrix} 1 \\ 0 \\ 0 \end{Bmatrix} \qquad \text{[Number 2]}$$

Next, the direction vector p of the torque yaw axis B is
obtained by the calculation shown in [Number 3]. The
torque yaw axis B is a straight line passing through the
coordinate of the center of gravity G of the electric com-
pressor 12 with the direction vector p calculated by [Number
3].

$$\beta = \begin{Bmatrix} \ddot{\theta}_{bx} \\ \ddot{\theta}_{by} \\ \ddot{\theta}_{bz} \end{Bmatrix} = I^{-1} \begin{Bmatrix} 0 \\ 0 \\ 1 \end{Bmatrix} \qquad \text{[Number 3]}$$

The first rubber mounts 24a are arranged on both sides of
the case 18 in the extension direction of the calculated torque
pitch axis A. The first rubber mount 24a is arranged in a
region with an inclination angle θ1 relative to the torque
pitch axis A of ±20 degrees. In short, the first rubber mount
24a should be located at least partially in a conical region
where the magnitude of the inclination angle θ1 relative to
the torque pitch axis A is 20 degrees. The conical region has
a shape of a right circular cone whose apex is the center of
gravity G of the electric compressor 12 and whose top angle
is 40 degrees, and the axis of rotational symmetry passing
through the apex is the torque pitch axis A. The first rubber
mounts 24a, 24a in this practical embodiment are located at
least partially on the torque pitch axis A. More preferably,
the center of gravity of each of the first rubber mounts 24a,
24a is located on the torque pitch axis A.

The second rubber mounts 24b are arranged on both sides
of the case 18 in the extension direction of the calculated
torque yaw axis B. The second rubber mount 24b is arranged
in a region with an inclination angle θ2 relative to the torque
yaw axis B of ±20 degrees. In short, the second rubber
mount 24b should be located at least partially in a conical
region where the magnitude of the inclination angle θ2
relative to the torque yaw axis B is 20 degrees. The conical region has a shape of a right circular cone whose apex is the
center of gravity G of the electric compressor 12 and whose
top angle is 40 degrees, and the axis of rotational symmetry
passing through the apex is the torque yaw axis B. The
second rubber mounts 24b, 24b in this practical embodiment
are located at least partially on the torque yaw axis B. More
preferably, the center of gravity of each of the second rubber
mounts 24b, 24b is located on the torque yaw axis B.

In the electric compressor 12, when the swivel scroll of
the scroll member 16 is driven to rotate by the output of the
electric motor 14, the swivel scroll rotates as an eccentric
mass, which generates a moment M1 around the torque pitch
axis A as the central axis, and a moment M2 around the
torque yaw axis B as the central axis as shown in FIG. 6.

The moment M2 around the torque yaw axis B causes
loads F1 and F2 in mutually opposite directions to act on the
first rubber mounts 24a, 24a, which are located at a distance
from the torque yaw axis B. In this practical embodiment,
since the first rubber mounts 24a, 24a have the same
distance from the center of gravity G through which the
torque yaw axis B passes, the loads F1, F2 by the moment
M2 have almost the same magnitude.

The moment M1 around the torque pitch axis A causes
loads F3, F4 in mutually opposite directions to act on the
second rubber mounts 24b, 24b, which are located at a
distance from the torque pitch axis A. In this practical
embodiment, since the second rubber mounts 24b, 24b have
the same distance from the center of gravity G through
which the torque pitch axis A passes, the loads F3, F4 by the
moment M1 have almost the same magnitude.

The first rubber mounts 24a, 24a are arranged in the
region with the inclination angle θ1 relative to the torque
pitch axis A of ±20 degrees, and in this practical embodi-
ment they are located on the torque pitch axis A. This
suppresses transmission of the moment M1 around the
torque pitch axis A through the first rubber mounts 24a, 24a
to the vehicle body side member 40. In particular, the first
rubber mounts 24a, 24a are tubular vibration-damping
devices, and the moment M1 acts mainly as a torsional input
around the center axis on the first rubber mounts 24a, 24a.
Hence, the low torsional stiffness of the first rubber mounts
24a, 24a allows the resonance frequency of the support
structure 10 of the electric compressor to be set at a lower
frequency.

The loads F1 and F2 resulting from the moment M2 acting
on the first rubber mounts 24a, 24a are transmitted to the
vehicle body side member 40 via the first rubber mounts
24a, 24a. However, since the loads F1 and F2 are exerted on
the vehicle body side member 40 with the same magnitude
in opposite directions, they cancel each other out at the
vehicle body side member 40. This reduces the vibration of
the vehicle body side member 40 caused by the transmission
of the loads F1 and F2 from the electric compressor 12.

Similarly, the second rubber mounts 24b, 24b are
arranged in the region with the inclination angle θ2 relative
to the torque yaw axis B of ±20 degrees, and in this practical
embodiment they are located on the torque yaw axis B. This
suppresses transmission of the moment M2 around the
torque yaw axis B through the second rubber mounts 24b,
24b to the vehicle body side member 40. In particular, the
second rubber mounts 24b, 24b are tubular vibration-damp-
ing devices, and the moment M2 acts mainly as a torsional
input around the center axis on the second rubber mounts
24b, 24b. Hence, the low torsional stiffness of the first
rubber mounts 24a, 24a allows the resonance frequency of
the support structure 10 of the electric compressor to be set
at a lower frequency.

The loads F3, F4 resulting from the moment M1 acting on the second rubber mounts 24b, 24b are transmitted to the vehicle body side member 40 via the second rubber mounts 24b, 24b. However, since the loads F3 and F4 are exerted on the vehicle body side member 40 with the same magnitude in opposite directions, they cancel each other out at the vehicle body side member 40. This reduces the vibration of the vehicle body side member 40 caused by the transmission of the loads F3 and F4 from the electric compressor 12.

Since the vehicle body side member 40 has a sufficiently large mass compared with the electric compressor 12, when the loads F1, F2 by the moment M2 or the loads F3, F4 by the moment M1 are input from the electric compressor 12, the displacement of the vehicle body side member 40 due to the input of such loads hardly affects the vibration state.

Figure 7:
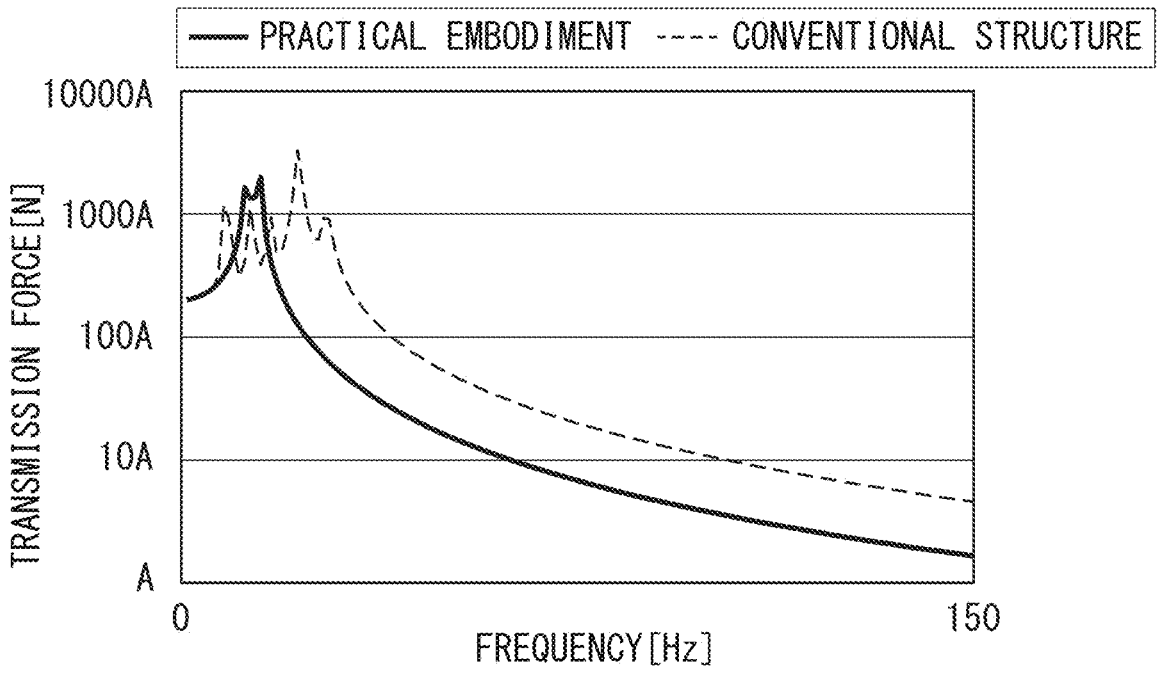
FIG. 7 is a graph of transmission force from a side of the electric compressor to a side of a vehicle body member.

By the way, it can be confirmed also by the graph of simulation results shown in FIG. 7 that the support structure 10 of the electric compressor according to the above-mentioned practical embodiment exhibits superior vibration-damping performance to that of the support structure of the electric compressor according to the conventional structure.

Figure 8:
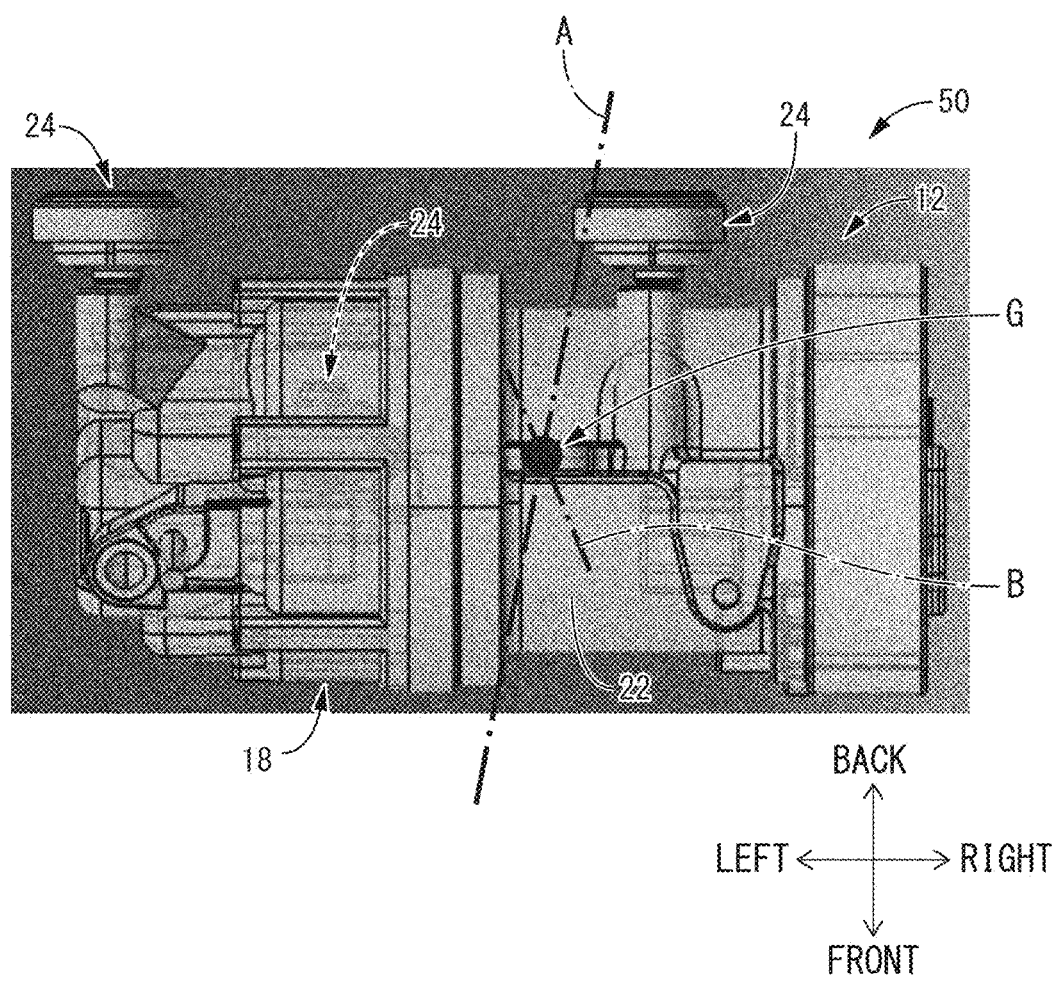
FIG. 8 is a plan view showing a support structure of a conventional electric compressor.
Figure 9:
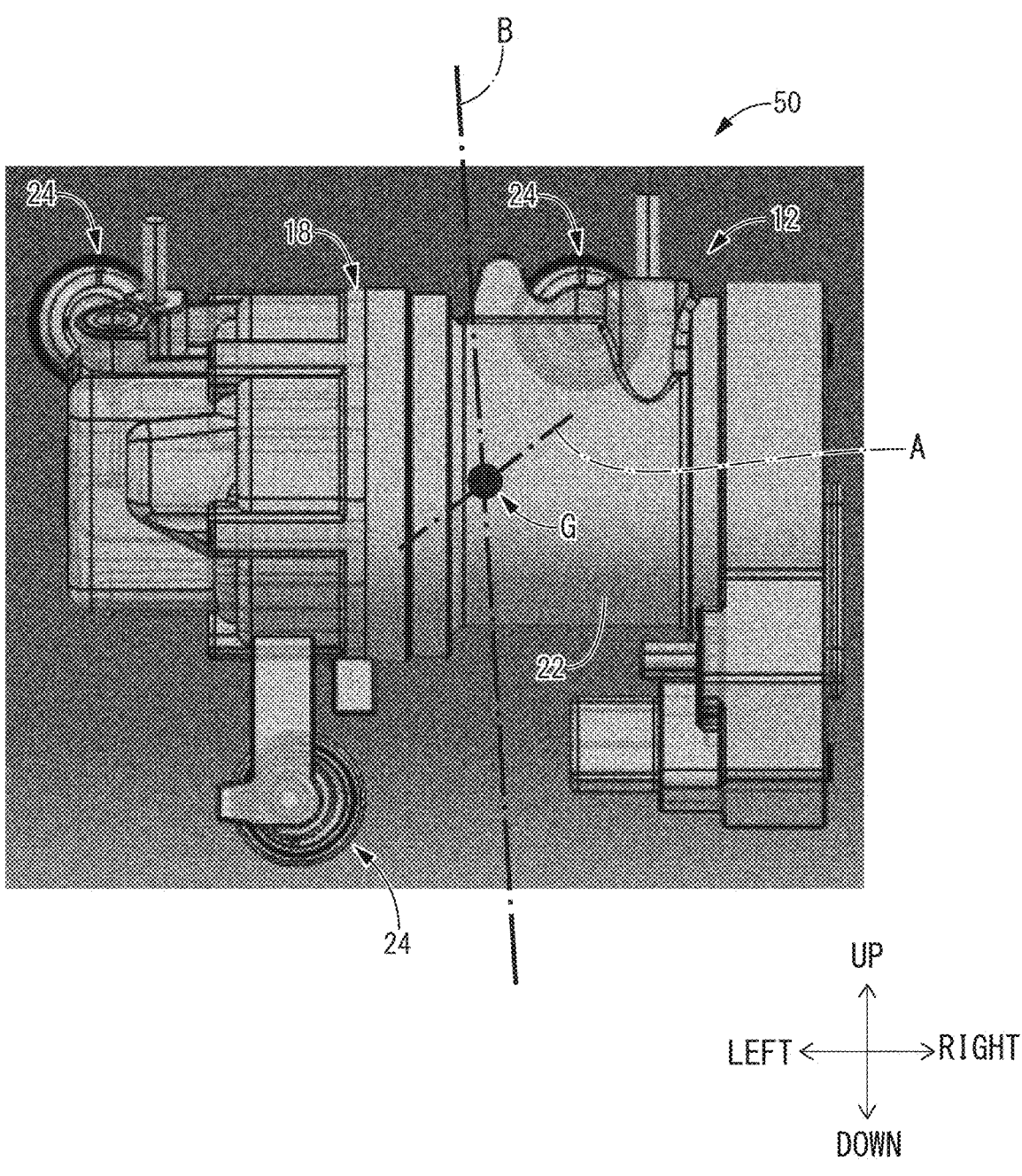
FIG. 9 is a front view of the support structure of the electric compressor shown in FIG. 8.
Figure 10:
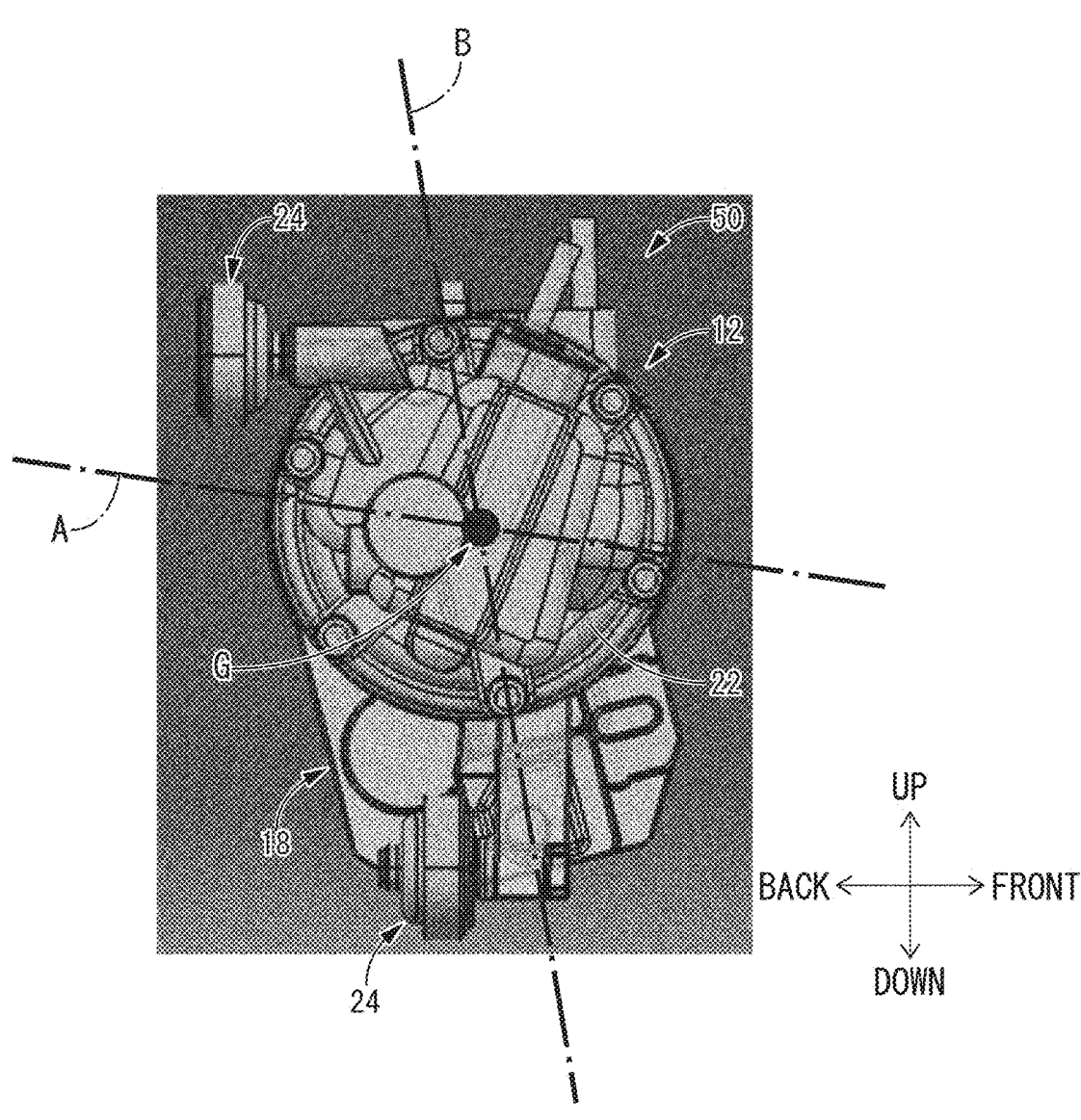
FIG. 10 is a left side view of the support structure of the electric compressor shown in FIG. 8.

FIGS. 8 through 10 show a support structure 50 of an electric compressor according to the conventional structure in the simulation that resulted in FIG. 7. The support structure 50 of the electric compressor supports the same electric compressor 12 as in the previous practical embodiment by the same rubber mounts 24 as in the previous practical embodiment. The support structure 50 of the electric compressor has at least one rubber mount 24 positioned outside of both the region of ±20 degree inclination angle relative to the torque pitch axis A and the region of ±20 degree inclination angle relative to the torque yaw axis B.

The graph in FIG. 7 indicates the frequency characteristics of the transmission force when vibration due to eccentric rotation of the swivel scroll acts. According to FIG. 7, the transmission force of the support structure 10 of the electric compressor of this practical embodiment, shown by the solid line, is smaller than the transmission force of the support structure 50 of the electric compressor of the conventional structure, shown by the broken line. Therefore, it is confirmed also by the simulation results that the support structure 10 of the electric compressor according to this practical embodiment exhibits superior vibration-damping performance to that of the support structure 50 of the electric compressor according to the conventional structure when vibration is generated due to eccentric rotation of the swivel scroll.

Although the practical embodiment of the present disclosure has been described in detail above, this disclosure is not limited by that specific description. For example, the rubber mount 24a may be located entirely away from the torque pitch axis A, as long as it is arranged in the region with the inclination angle θ1 relative to the torque pitch axis A of ±20 degrees. Similarly, the rubber mount 24b may be entirely away from the torque yaw axis B, as long as it is arranged in the region with the inclination angle θ2 relative to the torque yaw axis B of ±20 degrees.

A plurality of rubber mounts 24a, i.e., two or more, may be located on at least one side of the case 18, as long as the rubber mounts 24a are located on both sides of the case 18. However, also in this case, all the rubber mounts 24a are arranged in the region with the inclination angle θ1 relative to the torque pitch axis A of ±20 degrees. Similarly, a plurality of rubber mounts 24b, i.e., two or more, may be located on at least one side of the case 18, as long as the rubber mounts 24b are located on both sides of the case 18.

However, also in this case, all the rubber mounts 24b are arranged in the region with the inclination angle θ2 relative to the torque yaw axis B of ±20 degrees.

The structure of the rubber mount 24 is only an example. For example, even in the assumption of tubular vibration-damping device, the specific shape, size, and material, etc. of the inner shaft member 26, the outer tube member 28, and the main rubber elastic body 30 can be changed as appropriate. The mounting direction of the rubber mount 24 to the electric compressor 12 is not especially limited, although the direction in which the low-spring characteristic owing to the torsional spring component is exhibited against the moment around the torque axis as shown in the aforesaid practical embodiment is desirable.

In the above-mentioned practical embodiment, the rubber mount 24, which is the tubular vibration-damping device, is shown as an example of vibration-damping device. However, the vibration-damping device is not limited to the tubular vibration-damping device. For example, it is possible to employ a vibration-damping device with a structure in which a first mounting member and a second mounting member are adhered to both sides of a main rubber elastic body. Furthermore, the vibration-damping device may be, for example, a fluid-filled vibration-damping device that utilizes the flow action of a fluid or liquid sealed inside, a switchable vibration-damping device that allows switching of vibration-damping characteristics, or an active vibration-damping device that reduces vibration by active oscillation force in an offset fashion.

What is claimed is:

1. A support structure of an electric compressor for supporting the electric compressor in a vibration-damping manner with a vibration-damping apparatus on a vehicle body side member, the support structure comprising:

the electric compressor comprising:

an electric motor;

a scroll-type compression mechanism part driven to rotate by the electric motor; and a case housing the electric motor and the compression mechanism part arranged in series in a direction of an output shaft of the electric motor wherein the output shaft extends; and the vibration-damping apparatus comprising:

at least two first vibration-damping devices being located respectively on both sides of the case in an extension direction of a torque pitch axis intersecting the direction of the output shaft, each of the first vibration-damping devices being arranged in a region with an inclination angle relative to the torque pitch axis of ±20 degrees; and at least two second vibration-damping devices being located respectively on both sides of the case in an extension direction of a torque yaw axis intersecting the direction of the output shaft and the torque pitch axis, each of the second vibration-damping devices being arranged in a region with an inclination angle relative to the torque yaw axis of ±20 degrees.

2. The support structure of the electric compressor according to claim 1, wherein each of the first vibration-damping devices is located at least partially on the torque pitch axis, while each of the second vibration-damping devices is located at least partially on the torque yaw axis.

3. The support structure of the electric compressor according to claim 1, wherein each of the first vibration-damping devices is located singly on each side of the case in the extension direction of the torque pitch axis, while each of the second vibration-damping devices is located singly on each side of the case in the extension direction of the torque yaw axis.

4. The support structure of the electric compressor according to claim 1, wherein the first vibration-damping devices and the second vibration-damping devices each comprise a tubular vibration-damping device including an inner shaft member, an outer tube member, and a main rubber elastic body connecting the inner shaft member and the outer tube member, an axial direction of the inner shaft member of each of the first vibration-damping devices attached to the case is the extension direction of the torque pitch axis, and an axial direction of the inner shaft member of each of the second vibration-damping devices attached to the case is the extension direction of the torque yaw axis.

5. The support structure of the electric compressor according to claim 1, wherein for one of the first vibration-damping devices located on a first side of the case and an other of the first vibration-damping devices located on a second side of the case, a difference in distances from a center of gravity of the electric compressor is 20% or less of a shorter one of the distances, and for one of the second vibration-damping devices located on a first side of the case and an other of the second vibration-damping devices located on a second side of the case, a difference in distances from the center of gravity of the electric compressor is 20% or less of a shorter one of the distances.

* * * * *